(12) United States Patent
Jiang et al.

(10) Patent No.: US 11,022,766 B2
(45) Date of Patent: Jun. 1, 2021

(54) ADAPTER

(71) Applicant: LEONI KABEL GMBH, Roth (DE)

(72) Inventors: Bolin Jiang, Guangdong (CN); Juntao Deng, Jiangsu (CN); Marcus Bloom-Pflug, Neu-Ulm (DE); Qi Huang, Anhui (CN)

(73) Assignee: Leoni Kabel GMBH, Roth (DE)

( * ) Notice: Subject to any disclaimer, the term of this patent is extended or adjusted under 35 U.S.C. 154(b) by 0 days.

(21) Appl. No.: 16/978,114

(22) PCT Filed: Mar. 13, 2018

(86) PCT No.: PCT/CN2018/078859
§ 371 (c)(1),
(2) Date: Sep. 3, 2020

(87) PCT Pub. No.: WO2019/173971
PCT Pub. Date: Sep. 19, 2019

(65) Prior Publication Data
US 2020/0409003 A1 Dec. 31, 2020

(51) Int. Cl.
*G02B 6/42* (2006.01)
*G02B 6/43* (2006.01)
*H01R 13/506* (2006.01)

(52) U.S. Cl.
CPC ......... *G02B 6/4246* (2013.01); *G02B 6/4244* (2013.01); *G02B 6/4257* (2013.01);
(Continued)

(58) Field of Classification Search
CPC .. G02B 6/4246; G02B 6/4244; G02B 6/4257; G02B 6/42; G02B 6/4292; G02B 6/43; H01R 13/506
(Continued)

(56) References Cited

U.S. PATENT DOCUMENTS

| | | | |
|---|---|---|---|
| 6,994,480 B2* | 2/2006 | Inujima | G02B 6/4284 385/92 |
| 2005/0185963 A1* | 8/2005 | Ice | G02B 6/4292 398/135 |
| 2011/0150494 A1 | 6/2011 | Guo | |

FOREIGN PATENT DOCUMENTS

| | | |
|---|---|---|
| CN | 102103235 | 6/2011 |
| CN | 202600189 | 12/2012 |

(Continued)

OTHER PUBLICATIONS

International Search Report and Written Opinion of the International Search Authority for PCT/CN2018/078859, State Intellectual Property Office of the P.R.China, dated Nov. 29, 2018.

*Primary Examiner* — Michael P Mooney
(74) *Attorney, Agent, or Firm* — Williams Mullen; Thomas F. Bergert

(57) ABSTRACT

We generally describe an optical transceiver connector (100) comprising: a first portion (102) comprising a first port (101) configured to releasably receive an optical connector (202); and a second portion (104) comprising a second port (103) configured to releasably receive an optical converter element (205), wherein an opening of the first port (101) faces towards a first direction opposite to a second direction towards which an opening of the second port (103) faces, and wherein the first port (101) is aligned with the second port (103) for establishing a releasable, light-coupling-capable connection between a said optical connector (202) to be received by the first port (101) and a said optical converter element (205) to be received by the second port (103).

10 Claims, 7 Drawing Sheets

(52) U.S. Cl.
CPC ............. *G02B 6/4292* (2013.01); *G02B 6/43* (2013.01); *H01R 13/506* (2013.01)

(58) Field of Classification Search
USPC .................................................... 385/88–92
See application file for complete search history.

(56) References Cited

FOREIGN PATENT DOCUMENTS

| | | |
|---|---|---|
| CN | 104142538 | 11/2014 |
| JP | 2006189469 | 7/2006 |
| WO | 2013179197 | 12/2013 |

\* cited by examiner

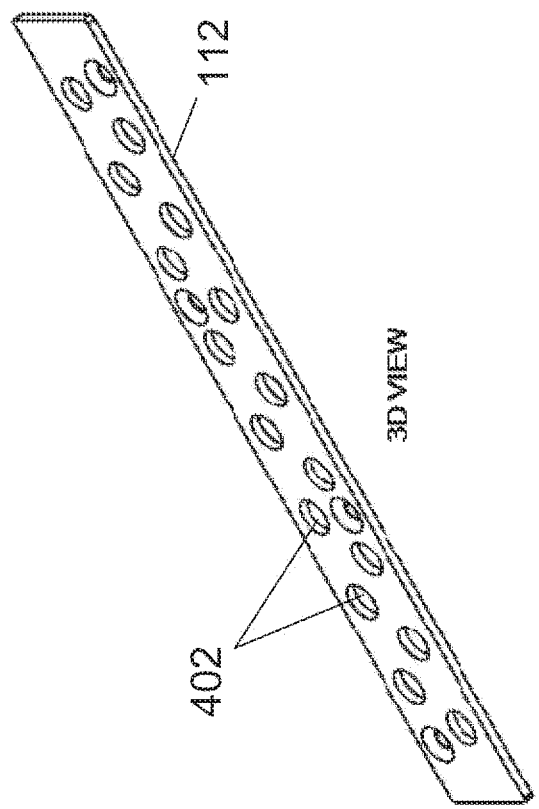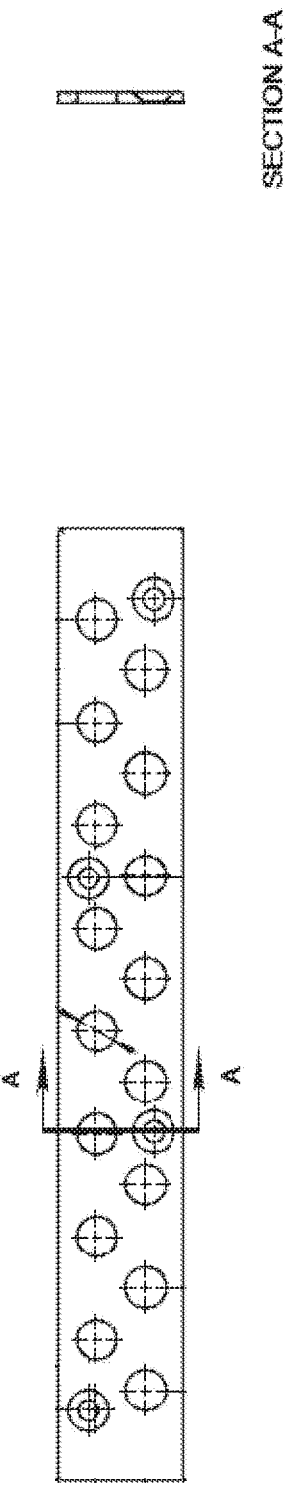
Figure 4

ADAPTER

CROSS-REFERENCE TO RELATED APPLICATIONS

This application is the U.S. national phase of international application PCT/CN2018/078859, filed on Mar. 13, 2018, which is hereby incorporated herein in its entirety by reference.

FIELD OF THE INVENTION

The present invention generally relates to an optical transceiver connector configured to establish a releasable, light-coupling-capable connection between an optical converter element and an optical connector. The optical transceiver connector may therefore be used in order to connect an optical converter element and a light source for transmitting and receiving a light signal between the optical converter element and the optical connector.

BACKGROUND TO THE INVENTION

Currently, optical transceiver connector adapters use special connector ports which are not easy to assemble and the power is not stable.

Solutions, for example, for an LED converter (optical converter element block) suffer from corresponding fiber connector/LED connections exhibiting insufficient power homogeneity. It was found by the inventors that solutions in which a lower plate is used in order to glue LEDs (for example up to 20 LEDs) thereon is burdensome in particular as special metal connectors may need to be used in order to connect an LED with a fiber. Given any tolerances which may be present when manufacturing bores/holes and the connector, large power losses may arise.

There is therefore a need for improvements of optical transceiver connectors.

SUMMARY OF THE INVENTION

The present invention is set out in the independent claim. Preferred embodiments of the invention are outlined in the dependent claims.

We describe an optical transceiver connector comprising: a first portion comprising a first port configured to releasably receive an optical connector; and a second portion comprising a second port configured to releasably receive an optical converter element, wherein an opening of the first port faces towards a first direction opposite to a second direction towards which an opening of the second port faces, and wherein the first port is aligned with the second port for establishing a releasable, light-coupling-capable connection between a said optical connector to be received by the first port and a said optical converter element to be received by the second port.

It is to be noted that any references as to a port being configured to releasably receive an optical converter element or a certain type of connector may relate to the port being shaped to correspond to the shape of a said optical converter element or connector, respectively. The optical converter element or connector may hereby be received by a said port in a snap-fit manner, or another type of coupling may be provided, for example in which members are provided on the optical converter element or connector which press against an (inside) wall of a port.

In some example implementations, the first and second ports of the optical transceiver connector may be provided with standard connector ports in order to connect the optical converter element and light.

Using variants of the optical transceiver connector as described herein therefore advantageously allows for being able to exploit standard connectors. Furthermore, example implementations of the optical transceiver connector are relatively easy to assemble in particular compared to adapters in which, for example, LEDs are glued and thereby fixed to a lower plate.

Given the precise alignment between the first and second ports (for example based on center axes of the respective first and second ports which may coincide), which alignment may be achieved when manufacturing the optical transceiver connector according to examples as described herein, it has been shown by the inventors that the performance (e.g. the performance for coupling light into the optical connector) is more stable compared to, for example, adapters in which LEDs are glued to an under plate.

The optical converter element may be, for example, a transmitter, a receiver or a transceiver.

In some variants of the optical transceiver connector, the first port comprises a first plurality of ports, wherein the second port comprises a second plurality of ports, and wherein each one of the first plurality of ports is aligned with a corresponding, respective one of the second plurality of ports for establishing a said releasable, light-coupling-capable connection between a said optical connector and a said optical converter element.

Implementations of the optical transceiver connector as described herein may be particularly advantageous as the quantity of the first plurality of ports and second plurality of ports may easily be changed according to the specific needs and requirements for the optical transceiver connector.

Variants of the optical transceiver connector therefore advantageously allow for positioning multiple optical converter elements, for example on a surface where fibers end, independently from each other. This may be achieved in variants of the optical transceiver connector as described herein by decoupling the connections and the fixed connection in the adapter block. Each of the connectors and each of the optical converter elements may be connected to the connector independently from each other.

Furthermore, example implementations of the optical transceiver connector as described herein may allow for replacing a single optical converter element (e.g. LED) when it is broken without having to replace the entire connection block, as was generally the case with adapters used thus far in the art (in particular adapters used in the art in which permanent connections using glues are provided). The construction of variants of the optical transceiver connector as described herein therefore provides for a better economical solution as well.

In some variants of the optical transceiver connector, the first portion and the second portion are separable from each other (for example, in the form of the first portion constituting or being comprised in a first part of the optical transceiver connector, and the second portion constituting or being comprised in a second part of the optical transceiver connector). Alternatively, the first and second portions may be provided in a single, solid and compact unit in which the first and second portions may not be separable from each other. Providing variants of the optical transceiver connector in which the first and second portions are separable from each other may be advantageous in particular as only one of the first or second portions may be replaced, as and when necessary, without having to replace the functioning portion at the same time. Furthermore, example implementations in which the first and second portions are separable from each other may advantageously allow for providing, for example, a first portion in which one or more (for example all) of the first ports may be configured to releasably receive an optical connector other than a particular single type of optical connector. The optical transceiver connector may thereby be interchangeably exploited for easily allowing light-coupling-capable connections using different optical connectors. The first portion may hereby be replaced with another first portion which comprises ports for releasably receiving a different type of optical connector.

In some example implementations, the optical transceiver connector further comprises a closing plate removably arranged on a surface of the second portion, wherein said surface faces towards the second direction, and wherein the closing plate comprises a hole (bore) which aligns with the opening of the second port. It will be appreciated that in variants in which the first portion comprises a first plurality of ports and the second portion comprises a second plurality of ports, the closing plate comprises a plurality of holes (bores), each of the holes of the closing plate aligning with corresponding, respective pairs of ports in the first and second portions.

The closing plate may hereby, in some variants, be screwed to a part, for example, the second portion of the optical transceiver connector.

The closing plate advantageously allows for easily opening the adapter at any desired time such that any number of optical converter elements may be replaced, for example when being damaged and/or when different wavelengths of the light source(s) are required. There is therefore no need for replacing the entire optical converter element block when only one or some of the individual optical converter elements are to be replaced.

In some variants, the optical transceiver connector further comprises a resilient member placed in the second port, wherein the resilient member is configured to be arranged between the closing plate and a portion of a said optical converter element when being received by the second port.

The resilient member may be particularly advantageous as it allows for compensating for different tolerances of the (optical) connectors. A solid connection for efficient light coupling may therefore be achieved despite the various different tolerances of the connectors. In some examples, the resilient member, when being provided between the closing plate and the portion of the optical converter element, pushes the optical converter element into place using a force acting on the resilient member and being provided by the closing plate, such that a stable connection when the optical converter element is releasably received by the second portion is established. The stable connection may therefore be achieved without having to, for example, glue the optical converter elements onto the connector.

In some examples of the optical transceiver connector, the resilient member comprises a rubber band. This may be advantageous as a rubber band may easily be replaced, it is relatively inexpensive and it provides for the resilient properties which may be desired.

In some example implementations, the optical transceiver connector further comprises a concentricity sleeve arranged within the second port, wherein the concentricity sleeve is configured to guide a said optical converter element when being received by the second port. The concentricity sleeve may hereby have a shape which corresponds to that of a connector to be received within the concentricity sleeve.

The concentricity sleeve may be manufactured with a very high precision (the precision being, for example, higher than a predetermined threshold) such that the ferrule of a connector may be positioned, for example, in the center of a light source. A high fitting accuracy (higher than a threshold) may be achieved via the concentricity sleeve.

In some example implementations of the optical transceiver connector, the closing plate comprises zinc zamak 5. This may be particularly advantageous as zinc zamak 5 has a relatively high strength and less ductility compared to other materials (such as, for example, zamak 3).

In some variants, the closing plate may comprise an insulated closing plate plating, depending on the desired properties of the closing plate.

In some examples of the optical transceiver connector, one or both of the first portion and the second portion comprise zinc zamak 5. As outlined above with respect to the closing plate, zinc zamak 5 has a relatively high strength and less ductility compared to other materials (such as, for example, zamak 3 or other standard alloys such as brass).

In some variants, the first portion comprises a nickel over copper plating. Such a plating may provide any properties (such as, for example, electrical properties and strength properties) required from the first portion. For equivalent reasons, in some variants, the second portion may comprise an insulated second portion plating.

In some example implementations of the optical transceiver connector, the second portion further comprises a third port having a second opening facing towards the first direction, wherein the second opening is aligned with the opening of the first port, and wherein the third port is configured to releasably receive a said optical connector received by and extending through the first portion via the first port.

This may be particularly advantageous as an improved guidance of the optical connector through the optical transceiver connector may be provided. An improved light coupling may also be achieved due to an improved alignment of the optical connector with the optical converter element.

The use of standard optical connectors, for example LC connectors, in adapters as described herein allows for achieving a particularly high packing density of connectors compared to conventional solutions using, for example, ST or SMA connectors. Economic viability and installation of products may therefore be increased.

Adapters as described herein may allow for providing connections between optical converter elements and different types of optical connectors which may be used and which may also provide a relatively dense packing of the optical connectors when being received by the optical transceiver connector.

The optical connector may be an LC connector, an SC connector, an MU connector, an FC connector, an MPO connector, an MTP connector or an MTRJ connector.

It will be appreciated that the first ports of the first portion (and optionally the third ports of the second portion) may be shaped such that one or more of the first ports (and optionally the corresponding third ports) may correspond to the shape of a first type of optical connector, while one or more other ones of the first ports (and optionally the corresponding third ports) may have a shape which corresponds to one or more other types of optical connectors.

BRIEF DESCRIPTION OF THE DRAWINGS

These and other aspects of the invention will now be further described, by way of example only, with reference to the accompanying figures, wherein like reference numerals refer to like parts, and in which:

FIG. 4 shows a schematic layout of a closing plate of optical transceiver connectors according to some example implementations as described herein;

DETAILED DESCRIPTION OF PREFERRED EMBODIMENTS

Figure 1A:
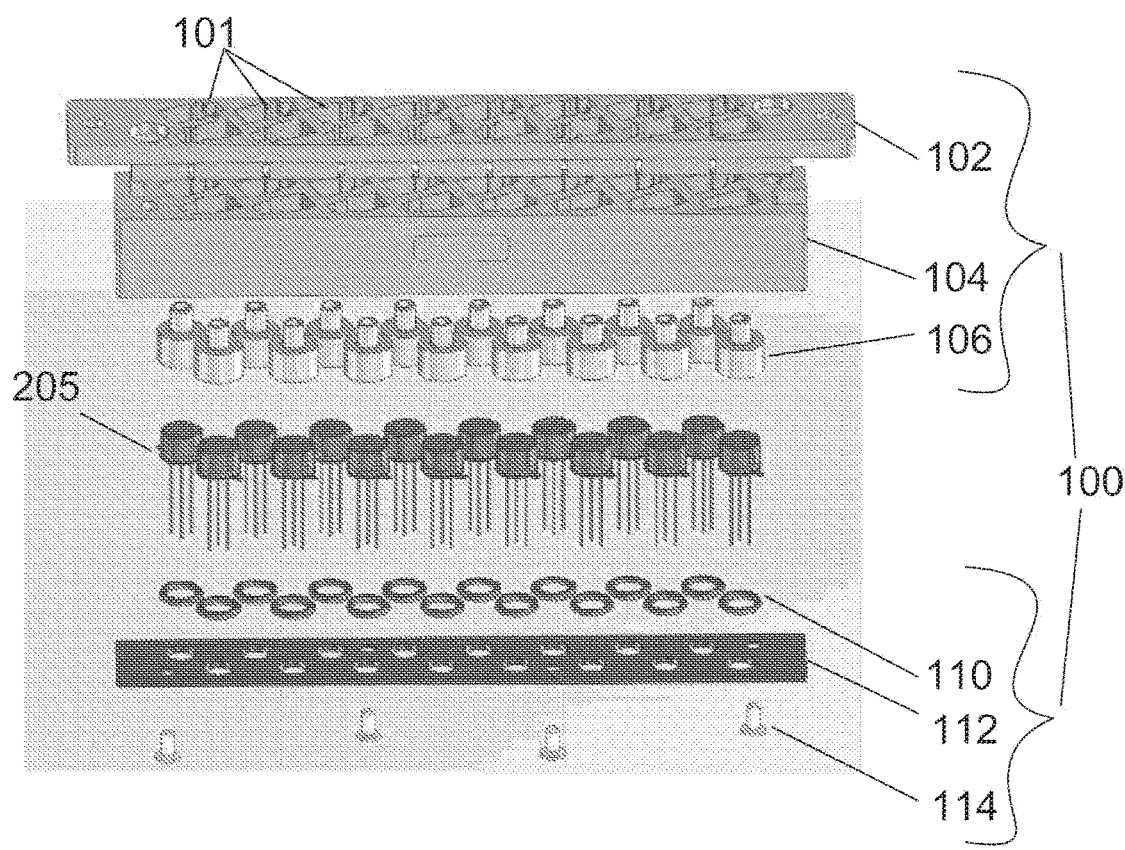
FIGS. 1a to d show schematic illustrations of optical transceiver connectors according to some example implementations as described herein.

FIG. 1a shows a schematic illustration of an optical transceiver connector 100 according to some example implementations as described herein. In this illustration, various components of the optical transceiver connector 100 are shown in a disassembled state for illustrative purposes.

In this example, the adapter relates to an optical converter element-to-LC optical transceiver connector 100. However, as will be appreciated, various components of the optical transceiver connector 100 may equally be implemented in an optical transceiver connector, whereby the optical connector may be an SC type connector, an MU type connector, and FC type connector, an MPO type connector, and MTP type connector or an MTRJ type connector.

In this example, the optical transceiver connector 100 comprises a first portion 102 which has a plurality of first ports 101. The plurality of first ports 101 are shaped such that, for example, LC standard connectors (which may have a specific shape) may be received so that the LC standard connectors may be inserted into the first ports in a 'snug-fit' manner. Throughout the present disclosure, such a 'snug-fit' insertion may refer to an insertion in which the optical connector is not loose within the port.

The optical transceiver connector 100 further comprises a second portion 104. In this example, the second portion 104 comprises a plurality of third ports 302 (see FIG. 3) which are shaped such that LC standard connectors (or other types of optical connectors) may be received (in a 'snug-fit' manner).

In this example, the first portion 102 and second portion 104 make up a two-piece HVDC housing.

In this variant, the optical transceiver connector 100 further comprises a plurality of concentricity sleeves 106. These tight tolerance and concentricity sleeves 106 are provided as separate components of the optical transceiver connector 100 in this example.

The concentricity sleeves 106 are shaped such that optical converter elements 205 may be received therein (for example in a 'snug-fit' manner).

In this example, the optical transceiver connector 100 further comprises a plurality of resilient members 110 which are provided, in this variant, as O-rings.

The optical transceiver connector 100 further comprises, in this example, a closing plate 112 having a plurality of holes which align with the ports and other parts of the optical transceiver connector 100 so as to allow for a light-coupling-capable connection between the light source and the LC connectors.

In this example, a plurality of screws 114 is used in order to releasably mount the closing plate 112 to the second portion 104.

Figure 1B:
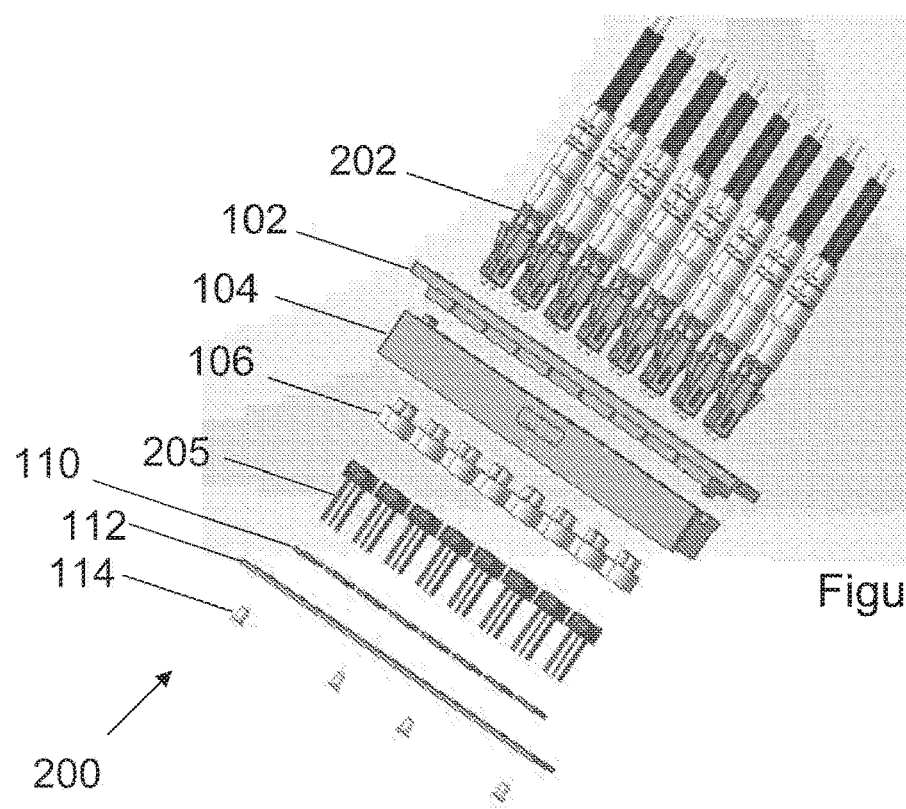

FIG. 1b depicts a schematic illustration of a construction 200 in which a plurality of LC connectors 202 is to be received by the optical transceiver connector 100. Once again, various components are shown in a disassembled state for illustrative purposes.

Figure 1C:
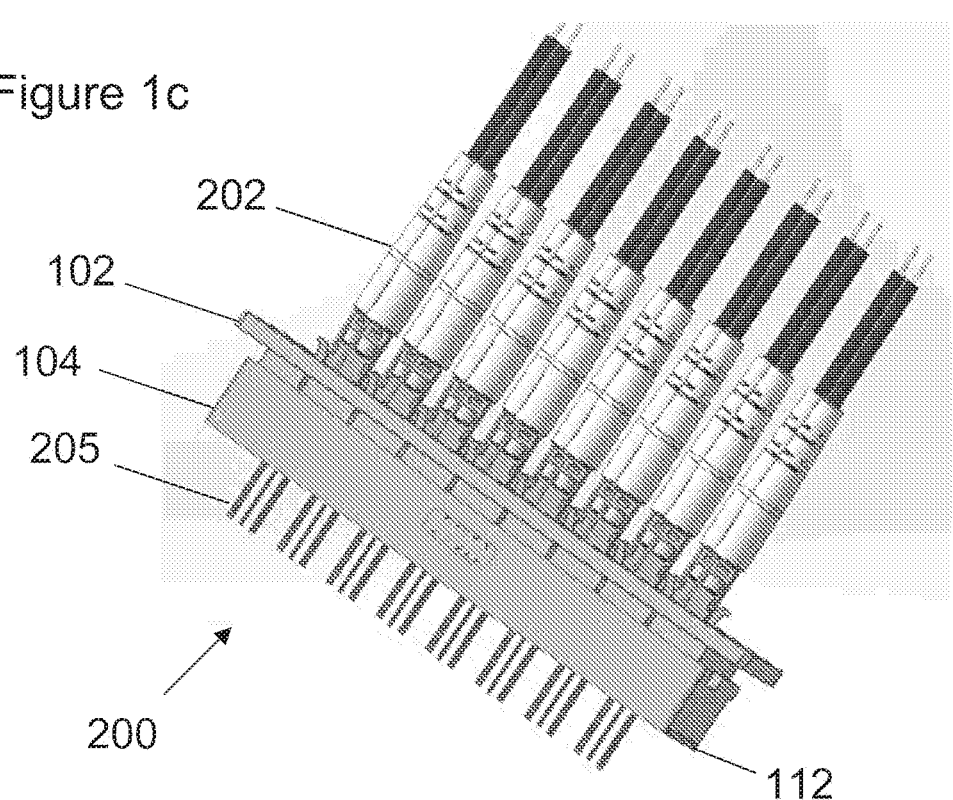

FIG. 1c is shows a schematic illustration of the construction 200 in which the various components are shown in an assembled state.

Figure 1D:
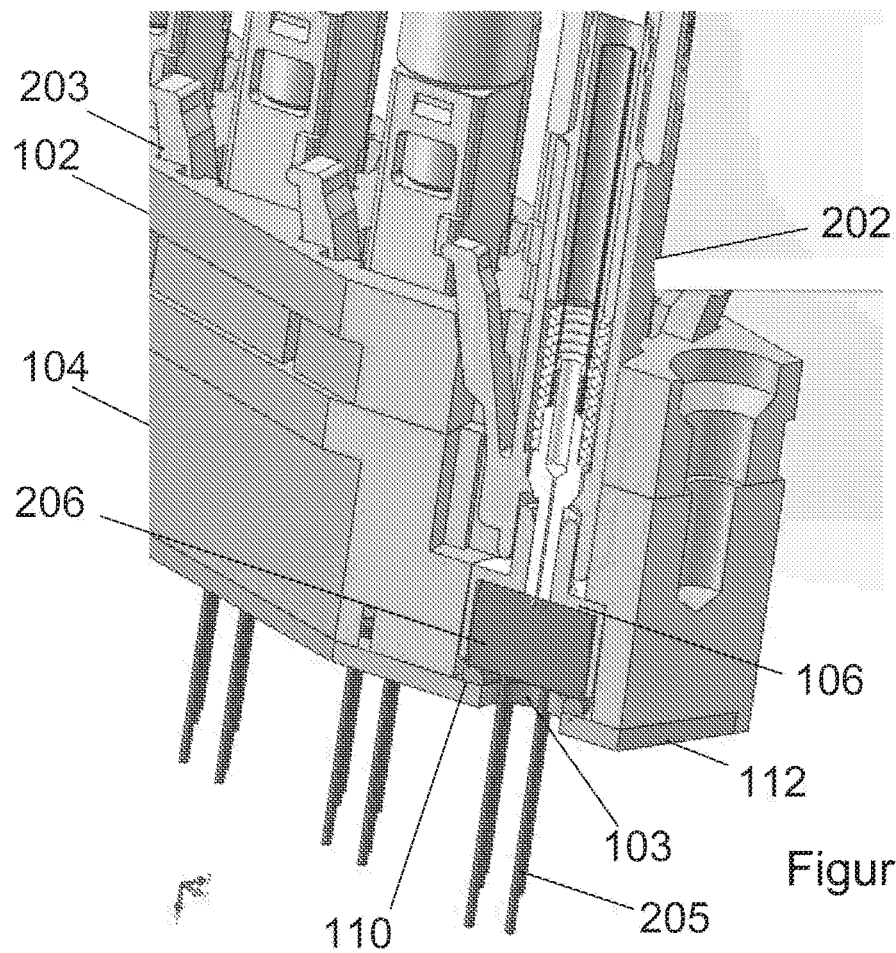

The assembled state depicted in FIG. 1c is also shown in FIG. 1d, in which parts of the by the optical transceiver connector 100 are displayed as a cross-sectional perspective view for illustrative purposes.

As can be seen, in this example, the LC connectors 202 comprise members 203 which are bent from an initial unbent state into a bent state when the LC connectors 202 are received by the first portion 102. This allows for a solid mounting of the LC connectors 202 in the optical transceiver connector 100. Other types of members 203, such as, but not limited to, springs or other flexible elements or snap-fit members which snap-fit into the ports may be provided.

As can be seen, in this example, the LC connectors 202 are inserted into the optical transceiver connector 100 such that the LC connectors 202 extend entirely through the first portion 102 and into a part of the second portion 104. The second portion 104 hereby comprises ports on a side of the second portion 104 facing away from the side at which the closing plate 112 is mounted to the second portion 104, such that an especially well-aligned connection between the LC connector ferrule and the optical converter element 205 is provided. This improved alignment may be achieved due to an improved guidance of the LC connector not only in the first portion 102, but also in (a part of) the second portion 104.

In this example, the optical converter elements 205 comprise portions 206 which are in light-coupling contact with the respective ferrules of the LC connectors 202. In this example, an alignment between the LC connectors 202 and the respective optical converter elements 205 are established such that the ferrule of each of the LC connectors 202 is aligned with a center axis of a corresponding, respective optical converter element 205.

As can be seen from FIG. 1d, an O-ring (e.g. rubber ring) 110 may be arranged between the portion 206 of the optical converter element 205 and the closing plate 112. This may allow for providing a stable arrangement of the optical converter element 205 within the second portion 104, in particular based on the O-ring 110 compensating for different tolerances of the connectors (i.e. shape of the connectors)/optical converter element.

Figure 2:
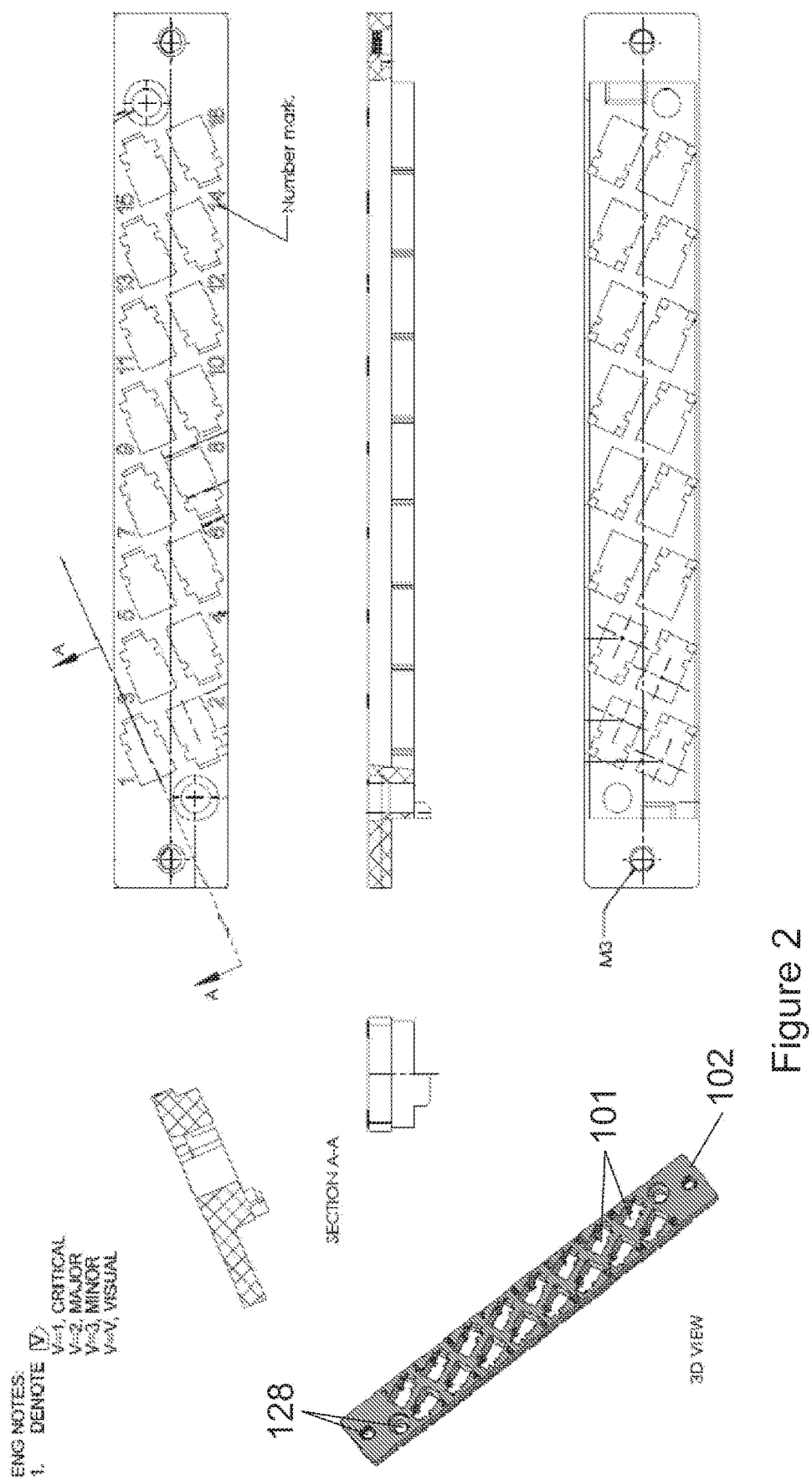
FIG. 2 shows a schematic layout of a first portion of optical transceiver connectors according to some example implementations as described herein.

FIG. 2 shows a schematic layout of a first portion 102 of optical transceiver connectors according to some example implementations as described herein. Dimensions of various parts may be chosen according to the respective needs.

In this example, the first portion 102 comprises a plurality of first ports 101 (see FIG. 1a) and a plurality of holes/bores 128 which may be used, for example, to screw the first portion 102 to the second portion 104.

The first ports 101 may be standard LC connector ports.

In this example, the first portion 102 comprises zinc zamak 5 and a nickel over copper plating (for electrical conduction). In this example, the first portion 102 is RoHS (Restriction of Hazardous Substances) compliant.

Figure 3:
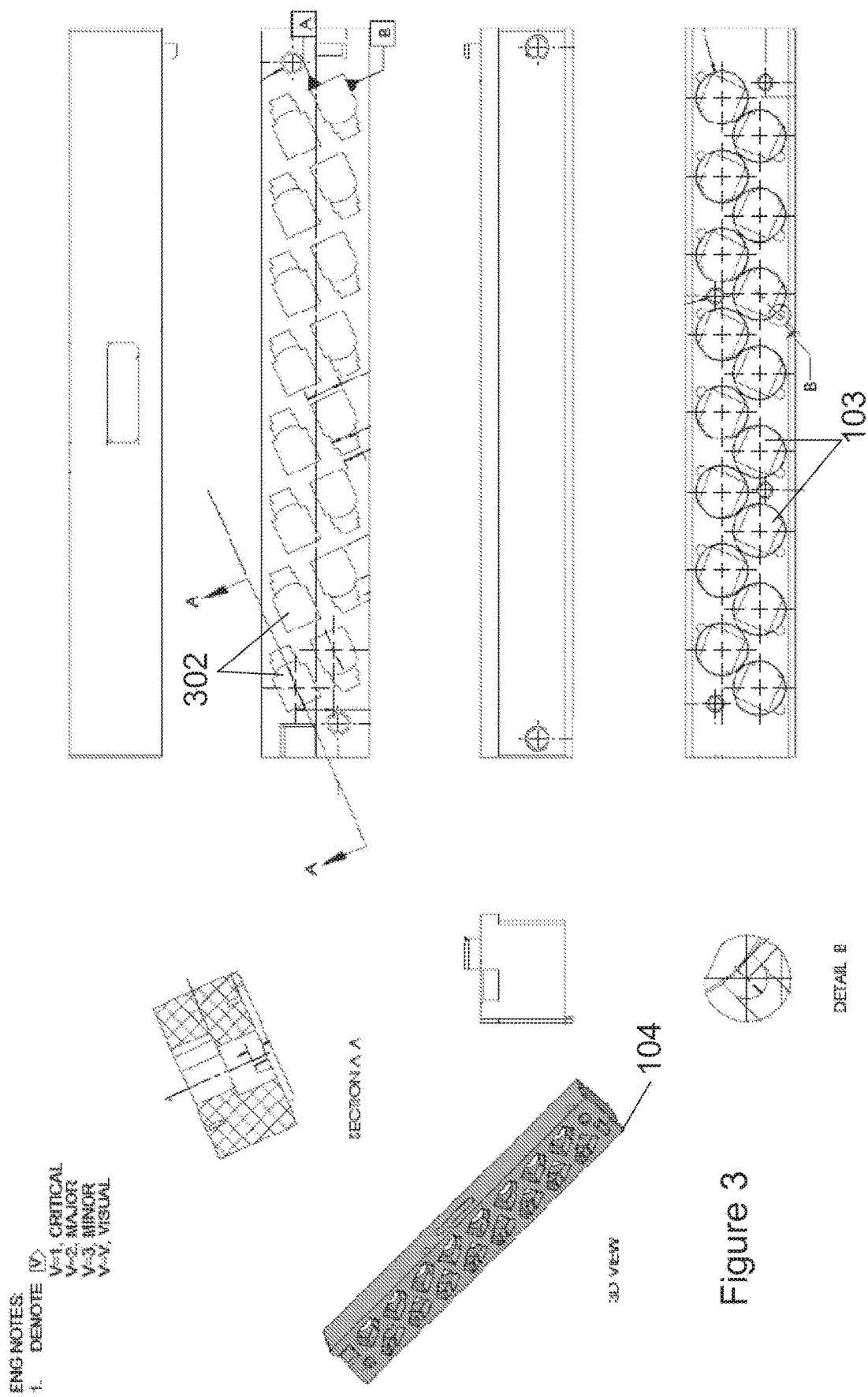
FIG. 3 shows a schematic layout of a second portion of optical transceiver connectors according to some example implementations as described herein.

FIG. 3 shows a schematic illustration of a second portion 104. In this example, the second portion 104 comprises a first plurality of ports 103 and a second plurality of ports 302. In this example, the second plurality of ports 302 is shaped such that LC connectors 202 may be received therein (e.g. in a 'snug-fit' manner).

Any information regarding the dimensions and RoHS compliance of the first portion 102 equally applies to the second portion 104.

In this example, the second portion 104 comprises zinc zamak 5 and an insulated plating.

The second portion 104 depicted in FIG. 3 will ultimately be assembled together with the first portion 102 and the closing plate 112.

FIG. 4 shows a schematic illustration of a closing plate 112. In this example, the closing plate 112 comprises holes/bores 402.

In this example, the closing plate 112 comprises zinc zamak 5 and an insulated plating.

Any information regarding the dimensions and RoHS compliance of the first portion 102 and the second portion 104 equally applies to the closing plate 112.

The closing plate 112 depicted in FIG. 4 will ultimately be arranged on a surface of the second portion 104.

In this example, any sharp edges of the closing plate 112 may be deburred and broken. It may, in some examples, be important to provide a closing plate 112 free from silicon and machine oil substances.

Figure 5A:
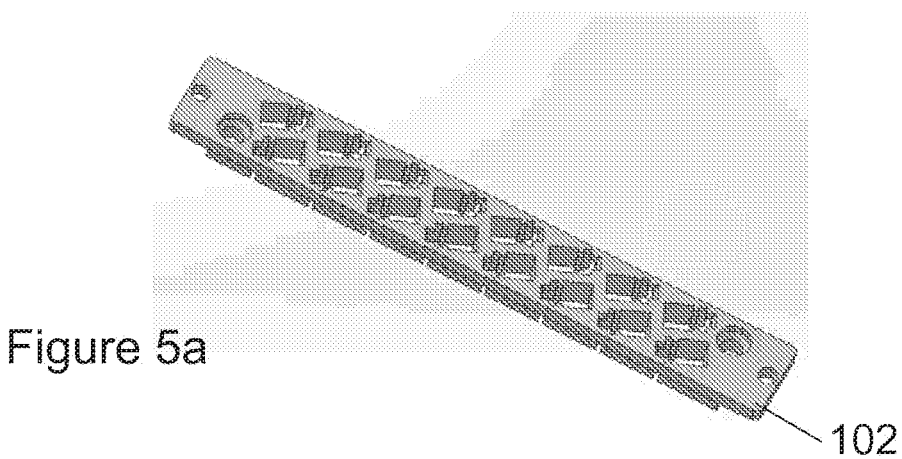
FIGS. 5a to c show schematic layouts of first and second portions of optical transceiver connectors in a disassembled and assembled state according to some example implementations as described herein.
Figure 5B:
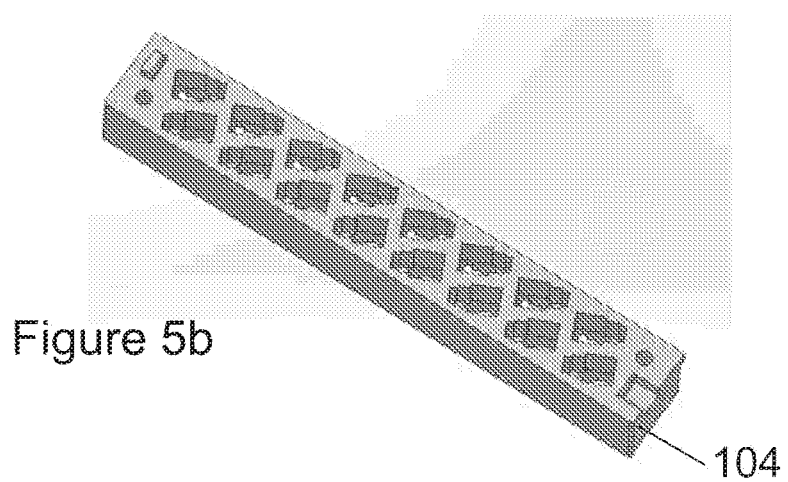
Figure 5C:
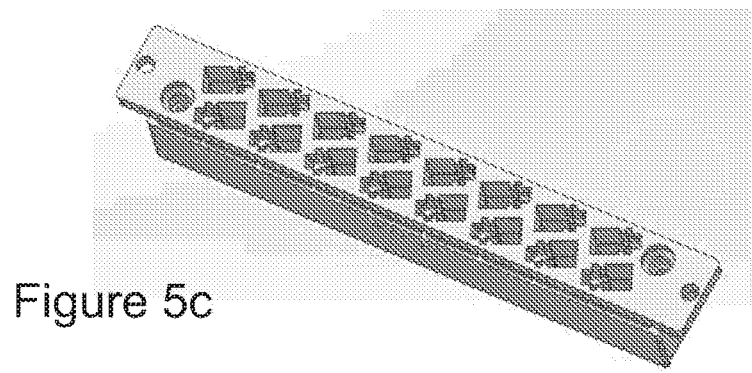

FIGS. 5a and b show schematic illustrations of a first portion 102 and a second portion 104, respectively. In FIG. 5c, the first portion 102 and the second portion 104 are depicted when being in an assembled state. Even though the first portion 102 and the second portion 104 are shown as separate components of the adapter, they may alternatively be designed in a single piece.

Figure 6:
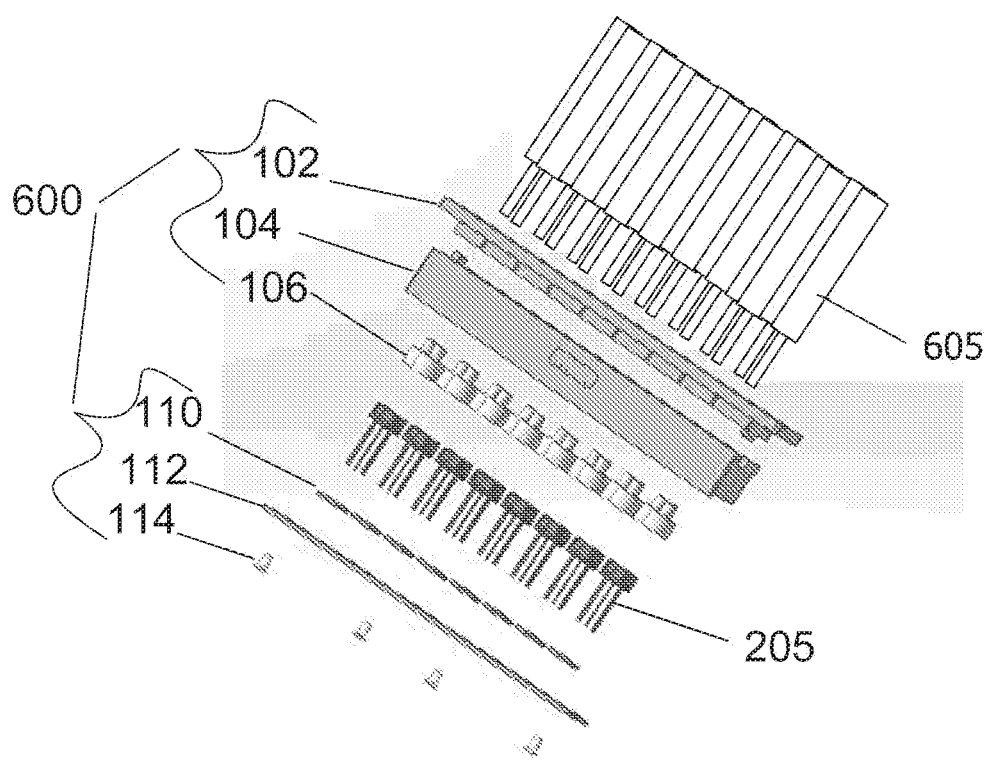
FIG. 6 shows a schematic illustration of an optical transceiver connector according to some example implementations as described herein.

FIG. 6 shows a schematic illustration of an optical transceiver connector 600 according to some example implementations as described herein.

In this example, connectors 605 are to be connected to the optical transceiver connector 600. The connectors 605 may be one or more of an SC connector, an MU connector, an FC connector, an MPO connector, an MTP connector and an MTRJ connector. One or more of the connectors 605 may also be LC connectors. As will be appreciated, various constellations of types of connectors 605 may be connected to the optical transceiver connector 600. Corresponding ports may be provided in the first portion 102, and optionally in the second portion 104.

Any variants of the optical transceiver connector as described herein may be used with any type of optical converter element. Furthermore, at least some examples described herein use 16 ports for LC to optical converter element connection. However, as will be appreciated, different quantities may be provided. Further still, certain types of, for example, metal connectors may be used in variants of the optical transceiver connector as described herein.

Any references throughout the description to a hole may equally relate to a bore.

No doubt many other effective alternatives will occur to the skilled person. It will be understood that the invention is not limited to the described embodiments and encompasses modifications apparent to those skilled in the art and lying within the scope of the claims appended hereto.

The invention claimed is:

1. An optical transceiver connector comprising:
   a first portion comprising a first port configured to releasably receive an optical connector; and
   a second portion comprising a second port configured to releasably receive an optical converter element,
   wherein the first portion and the second portion are separable from each other,
   wherein an opening of the first port faces towards a first direction opposite to a second direction towards which an opening of the second port faces, and
   wherein the first port is aligned with the second port for establishing a releasable, light-coupling-capable connection between a said optical connector to be received by the first port and a said optical converter element to be received by the second port.

2. An optical transceiver connector as claimed in claim 1, wherein the first port comprises a first plurality of ports, wherein the second port comprises a second plurality of ports, and wherein each one of the first plurality of ports is aligned with a corresponding, respective one of the second plurality of ports for establishing a said releasable, light-coupling-capable connection between a said optical connector and a said optical converter element.

3. An optical transceiver connector as claimed in claim 1, further comprising a closing plate removably arranged on a surface of the second portion, wherein said surface faces towards the second direction, and wherein the closing plate comprises a hole which aligns with the opening of the second port.

4. An optical transceiver connector as claimed in claim 3, further comprising a resilient member placed in the second port, wherein the resilient member is configured to be arranged between the closing plate and a portion of a said optical converter element when being received by the second port.

5. An optical transceiver connector as claimed in claim 4, wherein the resilient member comprises a rubber band.

6. An optical transceiver connector adapter as claimed in claim 1, further comprising a concentricity sleeve arranged within the second port, wherein the concentricity sleeve is configured to guide a said optical converter element when being received by the second port.

7. An optical transceiver connector as claimed in claim 3, wherein the closing plate comprises an insulated closing plate plating.

8. An optical transceiver connector as claimed in claim 1, wherein the second portion comprises an insulated second portion plating.

9. An optical transceiver connector as claimed in claim 1, wherein the second portion further comprises a third port having a second opening facing towards the first direction, wherein the second opening is aligned with the opening of the first port, and wherein the third port is configured to releasably receive a said optical connector received by and extending through the first portion via the first port.

10. An optical transceiver connector as claimed in claim 1, wherein the optical connector comprises an LC connector.

* * * * *